United States Patent [19]
Arnold

[11] Patent Number: 5,627,824
[45] Date of Patent: May 6, 1997

[54] TELECOMMUNICATIONS NETWORK

[75] Inventor: John S. Arnold, Nether Heyford, United Kingdom

[73] Assignee: GPT Limited, United Kingdom

[21] Appl. No.: 446,699

[22] PCT Filed: Jan. 7, 1994

[86] PCT No.: PCT/GB94/00029

§ 371 Date: Jul. 11, 1995

§ 102(e) Date: Jul. 11, 1995

[87] PCT Pub. No.: WO94/16511

PCT Pub. Date: Jul. 21, 1994

[30] Foreign Application Priority Data

Jan. 8, 1993 [GB] United Kingdom ............ 9300279

[51] Int. Cl.⁶ .................................. H04J 3/26
[52] U.S. Cl. .................................. 370/396
[58] Field of Search ............... 370/60, 94.1, 82, 370/83, 99, 58.1, 58.2, 58.3, 54, 110.1, 68.1, 79, 13, 14, 17

[56] References Cited

U.S. PATENT DOCUMENTS 5,157,654 10/1992 Cisneros .................. 370/94.1
5,315,588 5/1994 Kajiwara et al. ........... 370/60.1

FOREIGN PATENT DOCUMENTS

0425777A2 5/1991 European Pat. Off. .
0482550A1 4/1992 European Pat. Off. .
2255257A 10/1992 United Kingdom .

Primary Examiner—Wellington Chin
Assistant Examiner—Huy D. Vu
Attorney, Agent, or Firm—Kirschstein, et al.

[57] ABSTRACT

In a telecommunications switching network which has a plurality of sub-networks, each sub-network having a plurality of User Network Ports, the Destination and Source addresses in a cell-header carrier by a cell switched by the network are each divided into a Port Address part and a Sub-Network Address part, the Source Sub-Network part being implicit while the cell remains in the Source Sub-Network and similarly the Destination Sub-Network part is implicit when the cell arrives in the Destination Sub-Network, the Source and the Destination Sub-Networks being linked via a Cross-connect switching device wherein the address formats are changed.

4 Claims, 5 Drawing Sheets

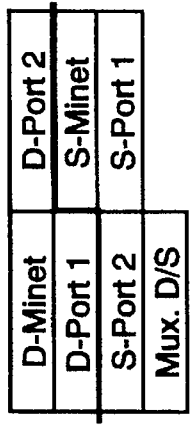
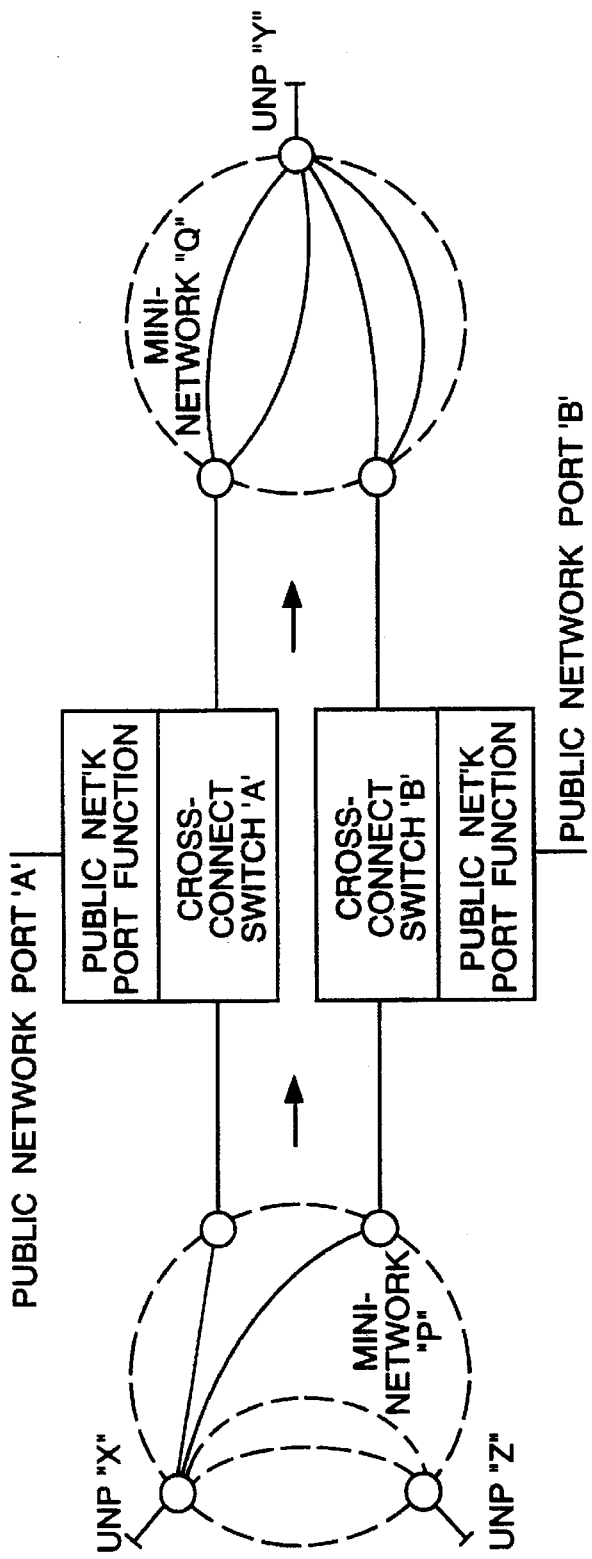
Fig. 1. PRIOR ART
D-Minet = DESTINATION MINI-NETWORK (1 OF 16)
D-Port 1 } = DESTINATION PORT (1 OF 256)
D-Port 2
S-Minet = SOURCE MINI-NETWORK (1 OF 16)
S-Port 1 } = SOURCE PORT (1 OF 256)
S-Port 2
Mux D/S = MULTIPLEXER SOURCE & DESTINATION (EACH 1 OF 4)
Fig. 4.

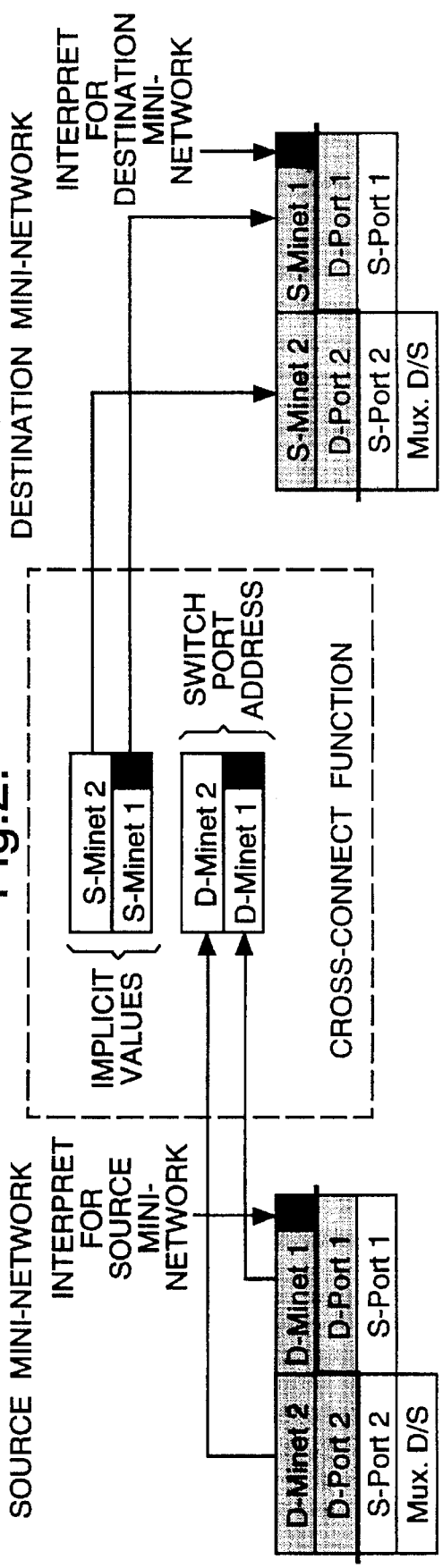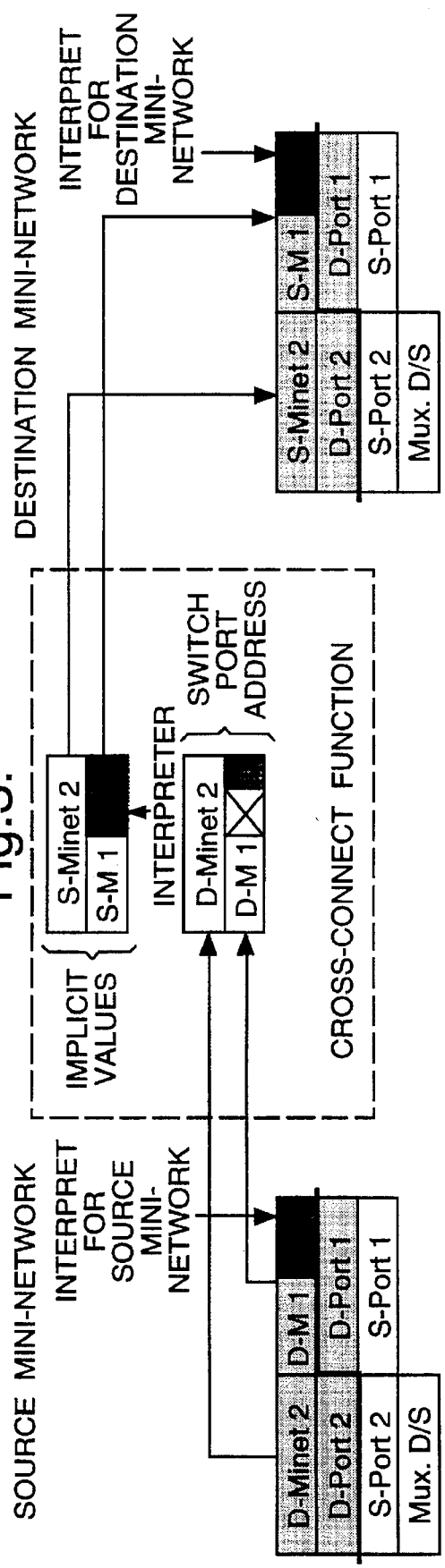

TELECOMMUNICATIONS NETWORK

BACKGROUND OF THE INVENTION

In United Kingdom Patent Application No. GB 2255257 is described an earlier concept for an Asynchronous Transfer Mode (ATM) self-routing network which may be used for Private Networks, Virtual Private Networks and distributed Local Area Switches in the Public Network. The service is connectionless using a, special format of the address octets i n the cell header; cells are directed to their respective destinations by an Interpreter held in each elemental switch or at each switch input port, depending upon implementation. No overhead is required in the cell Information Field which therefore corresponds to the payload in the ATM layer or a composite network; hence the use of standard adaption-layer formats is not compromised. This application is included herein by reference.

The network is divided into Mini-Networks typically with up to 256 user Network Ports. The size of the address field limits the number of Mini-Networks served to 16. The resultant cell header format is shown in FIG. 1.

It will be seen that such a network is limited to a maximum of 4k (4,096) User Network Ports, although thee use of multiplexers can substantially increase this number.

SUMMARY OF THE INVENTION

According to the present invention there is provided a telecommunications switching network comprising a plurality of sub-networks, each sub-network having a plurality of User Network Ports wherein the Destination and Source addresses in a cell-header carried by a cell switched by the network are each divided into a Port Address part and a Sub-network Address part and wherein the Source Sub-network part is implicit whilst the cell remains in the Source Sub-network and similarly the Destination Sub-network part is implicit from when the cell arrives in the Destination Sub-network, wherein the Source and the Destination Sub-networks are linked via a cross-connect switching device wherein the address formats are changed.

BRIEF DESCRIPTION OF THE DRAWINGS

The present invention will now be described by way of example, with reference to the accompanying drawings, in which:

FIG. 1 shows an example of a prior art cell header format;

FIG. 2 shows a variation of the format shown in FIG. 1 with the cross-connect function of the present invention;

FIG. 3 shows a further variation of the format shown in FIG. 1 having a modified cross-connect function;

FIG. 4 shows diagrammatically the paths between users on two mini-networks.

DETAILED DESCRIPTION OF THE PREFERRED EMBODIMENTS

Figure 5:
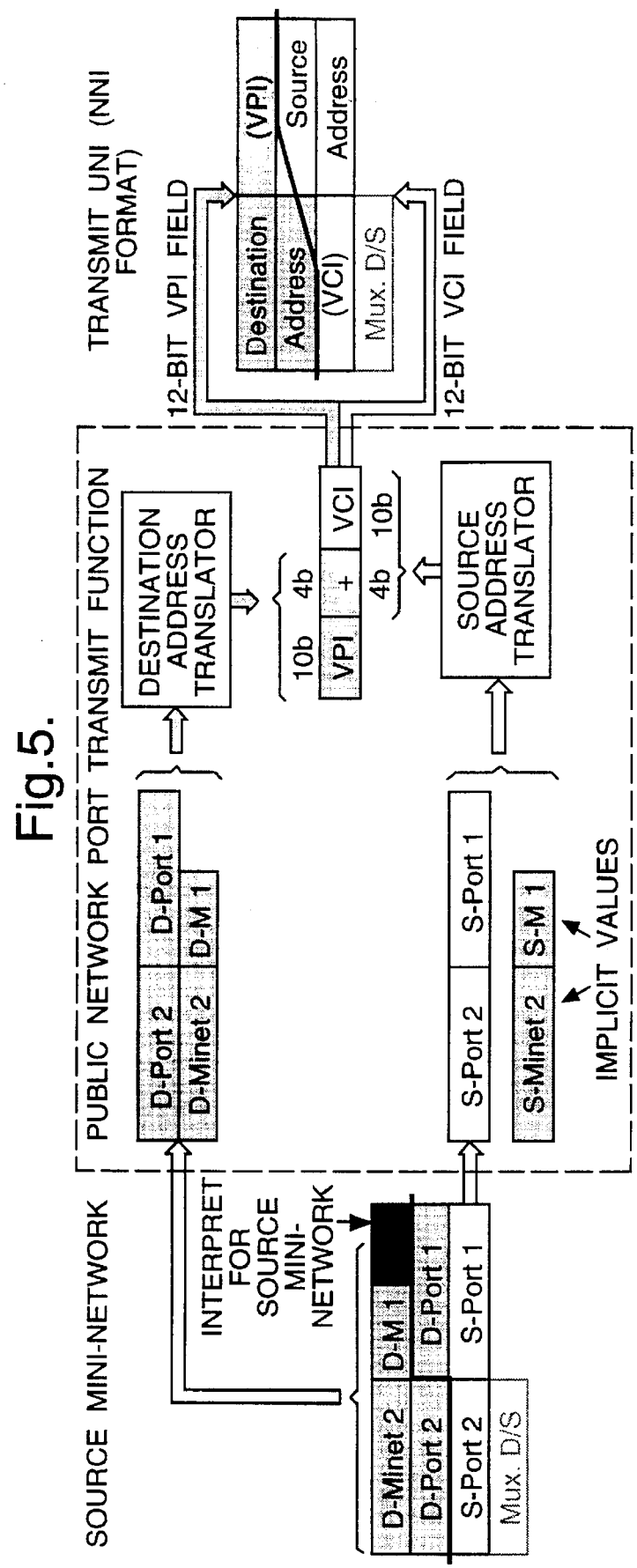
FIGS. 5 and 6 show diagrammatically the transmit and receive functions for a public network link.

The earlier network, as described above, uses a common address format throughout (apart from changes at the Public Network Port used in mapping to Public Virtual Circuits (PVCs) for inter-site links). This means that the Source Mini-Network address is carried in the source Mini-Network where it is redundant, being implicit, and similarly the Destination Mini-Network address is carried in the destination Mini-Network. FIG. 2 shows how, by eliminating this redundancy, in accordance with the present invention, the address capability may be expanded.

In the figures shaded areas show where changes have been made from the earlier format.

Two slightly different formats are used for the Source and Destination Mini-Networks respectively and, since a Mini-Network is relatively unstructured internally, it is necessary to inform the interpreters which format is being used and this is done by using the least significant bit of the most significant octet of the cell header as a Source/Destination (S/D) format indicator. Within the cross-connect function both Source and Destination Mini-Network identities must be known but, since the total information required to be held exceeds the capacity of the standard cell header format, the function must be internal to a switch element.

The rules for Interpretation are as follows:

If the S/D bit is zero AND the D-Minet 1,2 field indicates own Mini-Network then route on D-Port 1,2.

If the S/D bit is zero AND the D-Minet 1,2 field indicates that the destination is NOT own Mini-Network then route on D-Minet 1,2.

If the S/D bit is one then route on D-Port 1,2.

The theoretical maximum addressing capability using the cell header formats of the present invention is 128 Mini-Networks with 256 User Network Ports (UNPs) each. The resultant maximum address range is 32k UNPs which is a very large number for a private broadband network.

In order to improve fault tolerance and to simplify congestion avoidance half of this capacity is sacrificed by pairing Mini-Networks so that two adjacent addresses serve the same group of UNPs. The LS bit of the Miner field is used to separate the two, this bit is referred to as the 'A' (for Alternative route) bit.

The A-bit is still included in the interpretation of the Minet field and is also included in interpretation of the Port field. By this means alternate paths are provided both for intra-Mini-Network and to cross-connect switches and public network ports.

The rules for interpretation are therefore modified as follows:

If the S/D bit is Zero AND the D-Minet 1,2 field indicates own Mini-Network then route on D-Port t,2 and the A-bit.

If the S/D bit is zero AND the D-Minet 12 field indicates that the destination is NOT own Mini-Network then route on D-Minet1,2 and the A-bit.

If the S/D bit is one then route on D-Port 1,2 and the A-bit.

It will be seen that the A-bit is included in the interpretation whatever the state.

The value of the A-bit is normally not the user's concern, being set in the Exchange Terminator (ET) from a table for the 16 possible Virtual Connections (VCs) and maintained by the Resource Manager. However, for certain functions (for example Multicast codes), the two addresses may be used individually. The S/D bit, normally used to identify the header format, is redundant in the upstream UNP link; and is used instead to inform the ET that the A-bit value given is real. Note that this feature is implemented by user choice, in a network where the address range is not a pressing problem users may prefer to leave the choice up to the manager.

If the connection is to another Mini-Network the A-bit (in fact the Destination A-bit (DA-bit)) would be used to select one of two separate cross-connect switches. In the chosen cross-connect switch the DA-bit is ignored. The cross-connect function will replace the D-Miner field with the S-Minet field and set the S/D-bit to '1'. The Source A-bit (SA-bit) will be set from the interpreter to a value chosen by the Resource Manager resulting in two routes to the destination UNP from each of the two cross-connect switches. It will be seen that, by this means, the choice of preferred path is localized in each Mini-Network. FIG. 3 shows the modified connect function.

The DA-bit may also be used to choose one of two Public Network Ports; however this bit is ignored in the transmit function it being assumed that the public network provides its own means of avoiding congestion and faulty equipment. At the Public Network Port receive function the SA-bit is added in thee same way as for a cross-connect.

FIG. 4 illustrates the alternative paths available from a user on UNP "X" on Mini-Network "P" to a user on UNP "Y" on Mini-Network "Q" and also to a user on his own Mini-Network and to the Public Network ports.

The theoretical maximum addressing capability using the cell header format of the present invention is 128 Mini-Networks with 256 User Network Ports each; however, in a Virtual Private Network (VPN) using PVCs on ATM cross-connects in the Public Network to interconnect sites, the maximum is unlikely to be achievable. The reason for this is that the Public Network is performing the cross-connect function described earlier but, being a large and distributed network, it cannot offer the increased address space available internal to a cross-connect switch. This problem is reduced, but not eliminated, by the alternative-routing feature (A-bit) which halves the effective number of Mini-Networks served over public network links and is further reduced by using the A-bit real address feature, where two Public Network Ports are fitted which may, in this case, be accessed under user control and have different translators.

The User-Network Interface (UNI) format for links with the public network is too restrictive with the VPI field limited to 8 bits; however, it is possible to negotiate an Network-Network Interface (NNI) access format with the public network operator. The Generic Flow Control (GFC) field is lost but public network generic flow control adds little to the inbuilt congestion control of the VPN management tools, which monitor queue lengths and provide a service-friendly mechanism for restricting bandwidth on specific links. All that is necessary in addition is a communication channel between the private network manager and the public network manager, a channel provided in the site networks by the network signalling.

Even using the NNI format on the UNI link the address capacity is still not enough for a single access link to address the complete network. In the scenario described below User Network Ports (UNPs) are of two types:

Those with access to/from the Site network only (type "S").

Those with Universal access (type "U").

Unlike the private network described earlier where the Virtual Path Identifier (VPI) and Virtual Channel identifier (VCI) cell header fields carry absolute addresses for UNPs in the private network, these fields in the public network provide a unique path/channel identity only on a single link. Excluding the LS 4 bits of the VPI field there are 24 bits available and the value carried in these bits must uniquely identify, at the source end:

The identity of the (type U) destination UNP in the total . external network.

The identity of the (type U) source UNP on the source site.

Rule 1

The product of the total number of User Network Ports of type U served by the link in the external network, and the number of User Network Ports of type U served by the link in the source network, must not exceed $2^{24}$.

ATM switches used in a public connection-mode network have to provide translation of the address field values. For ATM transport network cross-connect switches it is likely that translation is limited to the 12-bit VPI field thus:

Rule 2

The number of destination sites served by the link must not exceed $2^{12}$.

The VCI field content is carried unchanged by the public network.

A complete network address is 15-bits long. Full source plus destination addresses would require 30 bits, but the ATM cell header (less the 4-bits used for the MUX field) provides only 24 bits; this available address space must be used as efficiently as possible. The alternative routing feature reduces the Network Port address to 14-bits so that the overlap between Source plus Destination addresses and the available address space on a public network PVC from 6-bits to 4-bits.

The space occupied by the source address depends upon the number of type U ports to be served; similarly the space required for the destination address depends upon the number of type U ports in the rest of the network. The boundary between these two number domains is variable, depending upon the configuration of the network; the maximum size of the source and the destination domains is 14 bits (assuming alternative routing is implemented) which implies a boundary region of 4 bits. Separate translators for source and destination addresses are required; each translator gives a 14-bit output word and the two words are merged with a 4-bit overlap. In the overlap region the two words are added; the effect of this is that the boundaries between the two domains need not be on a power-of-two boundary although in most cases, for ease of management, it will. The resultant interface function is shown in FIG. 5.

Figure 6:
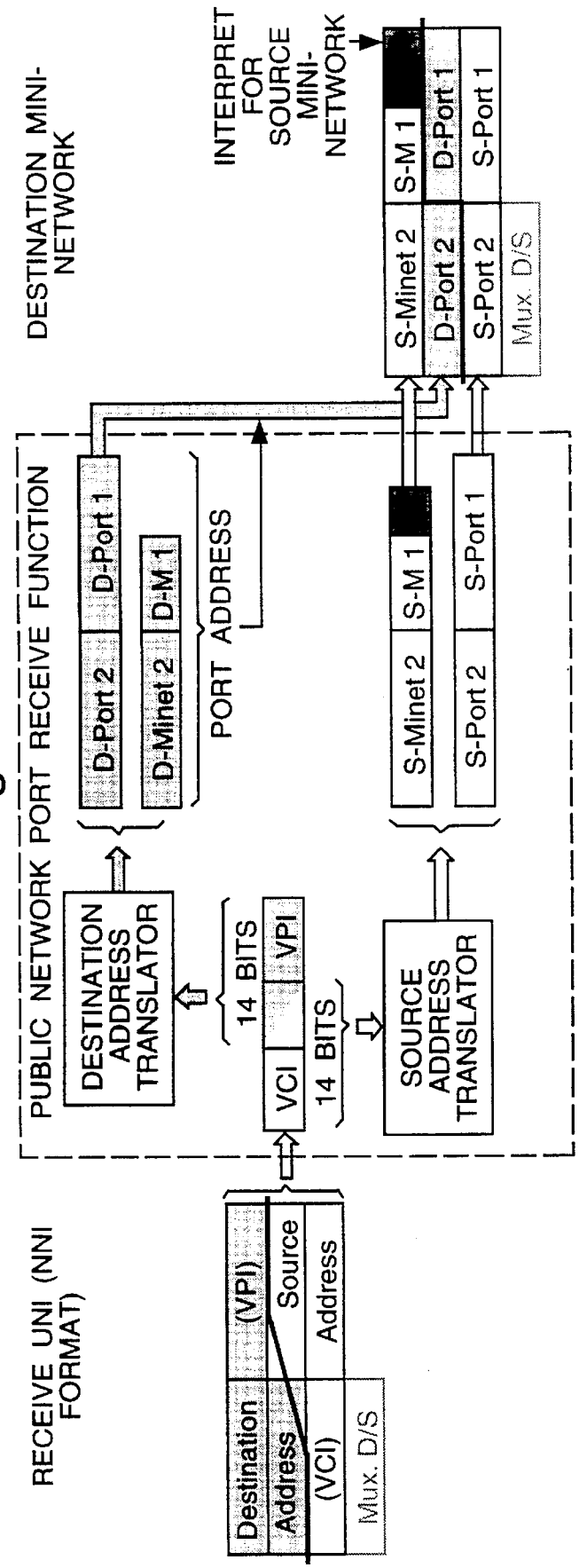

The corresponding function at the receive end of the link is shown in FIG. 6.

Note that the transmit function is closely associated with a multiplexer for inputs from several site Mini-Networks; similarly the receive function is associated with a demultiplexer for outputs to several site Mini-Networks.

The value of broadband ports which only have access to the on-site network (non-U) must be questioned, but this style of access is all that is needed for a user who works via an X.435 based broadband store-and-forward network with at least one on-site Node; the only theoretical limitation to such a mode of working is when live communication is necessary (e.g. a video link); however, store-and-forward has the very significant advantages of not interrupting current work and of avoiding problems with time differentials for widely separated sites (e.g. for US and European collaboration).

In order to enable management of the network a comprehensive signalling system must be provided. The signalling system is as described in GB 2255257 and is described briefly below.

Figure 7:
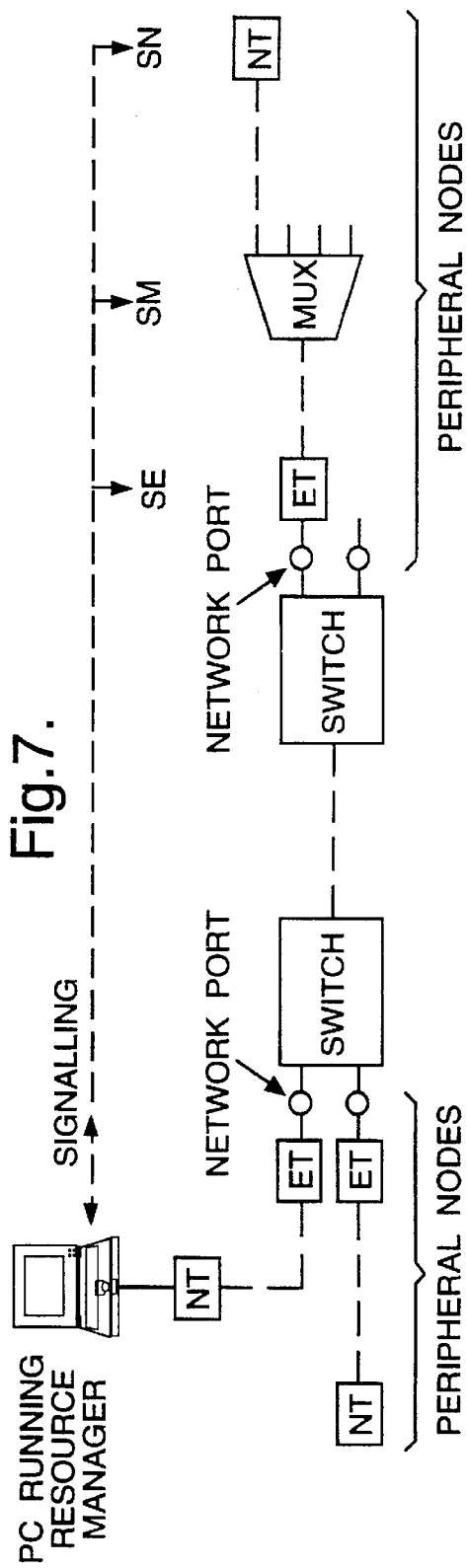
FIG. 7 shows diagrammatically the signalling system between peripheral nodes for the present invention.

There are five kinds of equipment node in a network as described, that is Switches, Public Network Ports Exchange Terminators (ET at the upstream end of an access link), Multiplexers and Network Terminators (NT at the downstream end of an access link). For Switches and Public Network Ports a unique signalling address is allocated to each node but this is not possible for peripheral nodes because the result would be a halving of the number of Network Ports which may be served. The mechanism used for peripheral nodes, that is ETs, Multiplexers and NTs, is described below, with reference to FIG. 7.

Switches route on the destination address only. Signalling to peripheral nodes uses the normal destination address of the Network Port but one of three reserved addresses is carried in the VCI field, normally used to carry the source address. The three addresses relate to the ET, the Multiplexer and the NT respectively. The displaced source address is carried in the Information Field of the cell but since signalling is only used intra-network, external equipment never sees this infringement of the "free-of-overhead" rule. All peripheral nodes are required to test all cells, on upstream and downstream intra-network ports, for the presence of the relevant signalling address.

As well as access to the network manager, the signalling provides for NT-to-NT (i.e. User-to-User) signalling and ET-to-ET signalling for test purposes and fault location.

Figure 8:
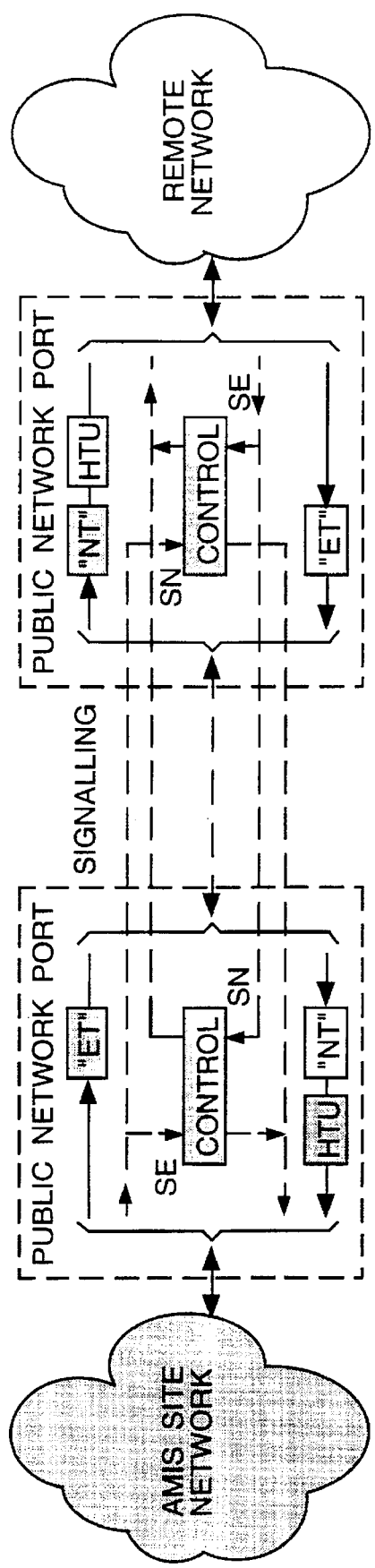
FIG. 8 shows diagrammatically the use of a Public Network Port address with addresses allocated in site networks.

Public Network Ports are allocated an address for signalling purposes. FIG. 8 shows how this address may be used in a reciprocal arrangement with addresses allocated in both Source and Destination site networks.

A principal use of this mechanism is the establishment and change of translation tables in the two ends or the link, from an instance of the resource manager running in either network.

There is one area where the lack of full connectivity between sites using the present invention can be an embarrassment and that is for the ubiquitous voice service; however, it its expected that the excellent service provided by modern PABXs will continue to be used. One of the several options possible to avoid the inefficiency and cost of separate inter-site Synchronous Transfer Mode (STM) links for the PABX network is to adapt primary-rate multiplexes to ATM channels which may be carried by the network. STM channels carried may use constant-bit-rate (CBR) or variable-bit-rate (VBR) coding ith silence suppression and compression (e.g. using G.764/G.727 modified for ATM). Access into the STM public network will, however, not be possible by this means unless/until the public network operator provides a compatible service.

I claim:

1. A telecommunications switching network comprising a plurality of sub-networks, each sub-network having a plurality of User Network Ports wherein the Destination and Source addresses in a cell-header carried by a cell switched by the network are each divided into a Port Address part and a Sub-network Address part and characterized in that the Source Sub-network part is implicit whilst the cell remains in the Source Sub-network and similarly the Destination Sub-network part is implicit from when the cell arrives in the Destination Sub-network, wherein the Source and the Destination Sub-networks are linked via a cross-connect switching device wherein the address formats are changed.

2. A switching network as claimed in claim 1, wherein the cell-header includes a format indicator to indicate the use of a Source or Destination format.

3. A switching network as claimed in claim 1, wherein the cell-header includes an alternative route bit to provide alternative paths for a cell to a group of User Network Ports (UNPs).

4. A switching network as claimed in claim 1, wherein the network includes a public network, the User Network Interface format including the space occupied by the Genetic Flow Control Field.

* * * * *